United States Patent [19]

Grosboll et al.

[11] 4,126,540

[45] Nov. 21, 1978

[54] APPARATUS AND PROCESS FOR DISTRIBUTING A MIXED PHASE THROUGH SOLIDS

[75] Inventors: Martin P. Grosboll, Homewood; Robert R. Edison, Olympia Fields; Thorpe Dresser, Markham, all of Ill.

[73] Assignee: Atlantic Richfield Company, Philadelphia, Pa.

[21] Appl. No.: 817,956

[22] Filed: Jul. 22, 1977

Related U.S. Application Data

[63] Continuation of Ser. No. 385,386, Aug. 3, 1973, abandoned.

[51] Int. Cl.$^2$ .......................... B01J 8/02; C10G 11/10
[52] U.S. Cl. ...................................... 208/146; 261/97; 261/113; 422/220
[58] Field of Search ............. 208/146; 23/284, 288 R; 261/94, 97, 98, 113

[56] References Cited

U.S. PATENT DOCUMENTS

| | | | |
|---|---|---|---|
| 3,112,256 | 11/1963 | Young et al. | 208/146 |
| 3,446,489 | 5/1969 | Leva | 261/97 |

Primary Examiner—Herbert Levine
Attorney, Agent, or Firm—John B. Goodman

[57] ABSTRACT

Disclosed is an apparatus for distributing a generally downwardly flowing liquid-vapor mixture through a bed of solid particles comprising:

(1) a tray deck located above said bed of solid particles;

(2) at least one hollow chimney member in fluid communication with said bed of solid particles attached to said tray deck and extending upwardly from said tray deck, said chimney member having at least one aperture through said chimney member along the length of said chimney member below the top opening of said chimney member to provide fluid communication between the space above said tray deck and the hollow space of said chimney member; and (3) plate means located at a distance D above the top opening of said chimney member whereby said mixture is restricted from flowing directly into the top opening of said chimney member.

An improved process for distributing a generally downwardly flowing liquid-vapor mixture is disclosed as well as an improved process for hydrocarbon conversion.

10 Claims, 4 Drawing Figures

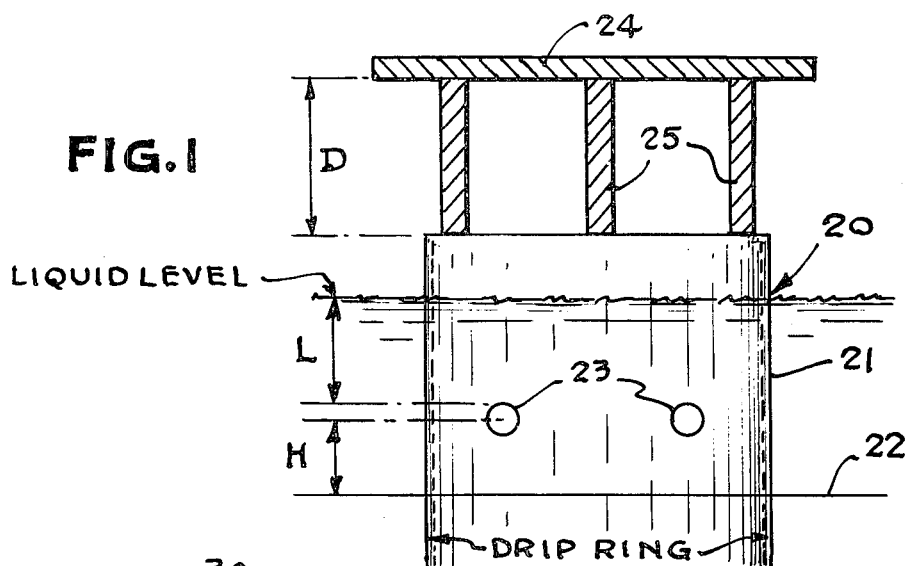
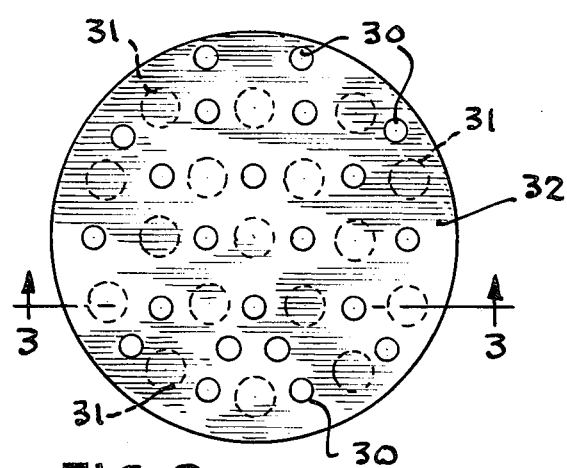
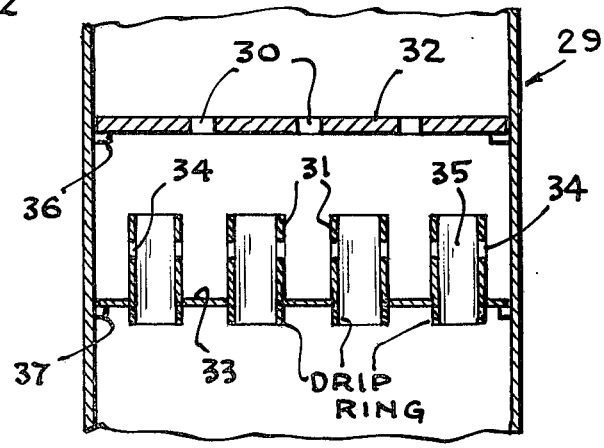
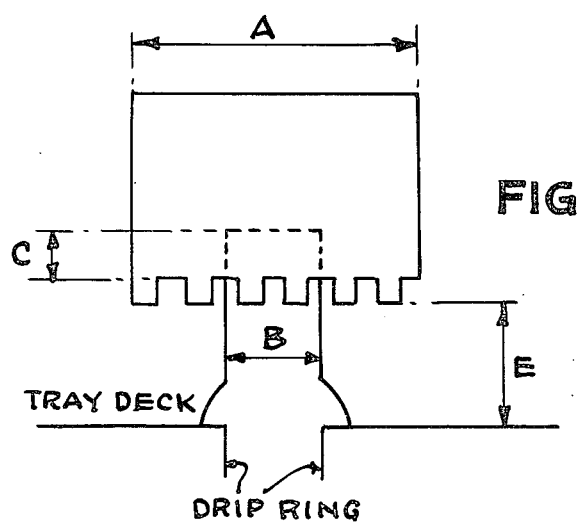

APPARATUS AND PROCESS FOR DISTRIBUTING A MIXED PHASE THROUGH SOLIDS

This is a continuation, of application Ser. No. 385,386, filed Aug. 3, 1973, and now abandoned.

BACKGROUND OF THE INVENTION

1. Field of the Invention

The present invention relates to an apparatus and process for improved distribution of a liquid-vapor mixture through a bed of solid particles as the mixture flows generally downwardly toward the solid particles. More particularly, the present invention relates to an apparatus and process for improved distribution of a liquid-vapor mixture through a bed of solid catalyst particles in a hydrocarbon conversion process as the mixture flows generally downwardly toward the solid particles.

2. Description of the Prior Art

In any process which involves contacting a fluid with a bed of solid particles, good distribution of the fluid through the solid particles is important to effectively practice the process since poor distribution can lead to poor contact between the fluid and the solid particles. This is especially important where a two-phase fluid, i.e., liquid and vapor, stream flows through a bed of solid particles, such as, for example, in a hydrocarbon conversion process wherein a liquid-vapor mixed stream flows in a generally downwardly direction through a bed of solid catalyst particles. Good fluid distribution in such a system is important to effectively utilize the catalyst, since with poor distribution some of the flowing material may by-pass at least a portion of the catalyst, thereby reducing catalyst effectiveness. The prior art has recognized the need for good fluid distribution. See, generally, Hoftzer, *Trans, Instn. Chem. Engrs.* v. 42, T109 (1964); Ross, *Chem. Engr. Progress,* v. 61, #10, 77 (1965); and Schiesser and Lapidus, *AICHEJ,* v. 7, 163 (1961).

One distribution device of the prior art is similar to a bubble cap used in distillation equipment. This distributor includes a cap having slots at the lowermost portion thereof and around its entire periphery. The cap covers the upper portion of a hollow chimney which is, in turn, attached to a tray. The cap member of the distributor prevents the downflowing liquid-vapor stream from entering the top opening of the chimney directly. A plurality of such distributors is placed on the tray which is located upstream from the bed of solid particles through which the liquid-vapor stream is to be distributed. The liquid phase is deflected by the cap and flows downwardly onto the tray. When the level of liquid on the tray is sufficiently high, the liquid beings to flow through the slots and thence down the chimney to the space below the tray. The vapor phase flows directly through the slots and then down the chimney. The concurrent flow of liquid and vapor through the slotted area promotes mixing and distribution of the liquid and vapor.

One major disadvantage of this type of distributor is its sensitivity to the level of the supporting tray. Small deviations in the tray level can cause major differences in the quantity of liquid that flows through individual distributors disposed on the tray. Thus, this type of distributor can result in poor distribution of fluid through a bed of solid particles. Therefore, it would be advantageous to provide an apparatus and process for distributing a liquid-vapor mixture through a bed of solid particles. Also, it would be advantageous to provide a liquid-vapor distribution apparatus and process which has reduced sensitivity to the levelness of the distribution apparatus.

SUMMARY OF THE INVENTION

It is therefore a primary object of the present invention to provide an improved apparatus for distributing a generally downwardly flowing liquid-vapor mixture through a bed of solid particles.

It is another object of the present invention to provide an improved distributor apparatus which has reduced sensitivity to the levelness of the apparatus.

It is a further object of the present invention to provide an improved process for distributing a liquid-vapor mixture through a bed of solid particles as the mixture flows generally in a downwardly direction toward the particles.

It is yet a further object of the present invention to provide an improved hydrocarbon conversion process wherein an improved apparatus is employed to provide for distribution of a liquid-vapor mixture flowing generally downwardly through a bed of solid catalyst particles. Other objects and advantages will become apparent hereinafter.

The present invention provides an apparatus for distributing a liquid-vapor mixture through a bed of solid particles, the apparatus comprising at least one tray deck located above the bed of solid particles having attached thereto at least one hollow chimney member in fluid communication with the bed of solid particles. The chimney member extends generally upward from, preferably perpendicular to, the tray deck. At a point along the length of the chimney member, preferably above the tray deck, below the top opening of the chimney member, the chimney member is provided with at least one aperture therethrough to provide fluid communication between the space above the tray deck (and exterior to the chimney member) and the hollow space of the chimney member. A plate means supported at a distance away from, preferably, above, the top opening of the hollow chimney member by suitable support means restricts the direct entry of fluid through the top opening into the hollow space of the chimney member. Thus, when a liquid-vapor mixture is made to flow downwardly onto such an apparatus, the vapor passes around the plate means and into the hollow space of the chimney member through its top opening while the liquid builds to a level at or, preferably above the level of the aperture in the chimney member at which point it flows through the aperture. Good distribution is achieved since the liquid and vapor are required to pass through separate openings and good liquid-vapor mixing occurs, for example, in the hollow space of the chimney member. Preferably, the apparatus comprises a plurality of hollow chimney members attached to the tray deck and spaced across substantially the entire cross-section of the tray deck. Although the lowermost portion of the chimney member may be attached to the tray deck, in many instances the chimney member is made to extend a distance, e.g., from about 0.1 inch to about 2 inches or more, below the tray. That portion of the chimney member below the tray deck functions as a drip ring to provide improved distribution at reduced liquid flow rates.

One specific embodiment provides a plate means comprising a perforated member. The perforated member is set in place, for example, supported by the walls of the vessel in which the distributor apparatus is located, at a suitable distance above the tray deck. The solid portion of the perforated member is situated so as to restrict the fluid flowing generally downwardly therethrough from entering directly into the top opening of the chimney member below.

The present invention also embodies an improved process, especially an improved hydrocarbon conversion process, wherein a generally downwardly flowing liquid-vapor mixture is contacted with at least one bed of solid catalyst particles at hydrocarbon conversion conditions. The improvement comprises:
1. providing at least one of the apparatus as described previously above the top of the bed of solid particles; and
2. causing a liquid-vapor mixture to flow in a generally downwardly direction toward the apparatus whereby at least a portion, preferably a major portion, of the vapor enters the hollow space of the chimney member or members through the top opening of the chimney member or members and at least a portion, preferably a major portion, of the liquid enters the hollow space of the chimney members through the aperture or apertures.

BRIEF DESCRIPTION OF THE DRAWINGS

FIG. 1 is a frontal view of one embodiment of the apparatus of the present invention.

FIG. 2 is a top elevational view of another embodiment of the apparatus of the present invention.

FIG. 3 is a sectional view along line 3—3 of FIG. 2.

FIG. 4 is a frontal view of a prior art distributor cap employed in the examples.

DESCRIPTION OF THE PREFERRED EMBODIMENTS

Referring now to the drawings, FIG. 1 is a frontal view of one embodiment of the apparatus of the present invention. The apparatus 20, comprises at least one and preferably a plurality of hollow chimney member 21 having top and bottom openings therein and attached to a tray deck 22. A plurality of hollow chimney member 21 can be distributed across substantially the entire cross-section of the tray deck 22. The number of chimney members preferably range from about 0.2 to about 6, more preferably from about 1 to about 3, per square foot of tray deck. At least one and preferably a plurality of apertures 23 are provided through the chimney members 21. Each chimney member 21 often has from 1 to about 20, preferably from about 3 to about 8, apertures 23, for example, at evenly spaced intervals around the perimeter of chimney member 21. The cross-sectional area of each aperture 23 may range in size from about 0.05 square inches to about 3.0 square inches or more, preferably from about 0.10 square inches to about 1.0 square inches.

The hollow chimney members 21 may be of any geometry, preferably cylindrical, and may be of different or, preferably, uniform sizes. The top opening of chimney member 21 is preferably in the range from about 1 inch to about 24 inches, more preferably from about 3 inches to about 12 inches above the tray deck 22. The cross-sectional area of the top opening of the chimney members 21 is preferably in the range from about 3 square inches to about 100 square inches, preferably from about 7 square inches to about 60 square inches.

Among the factors which can be used to determine the number, size and location of the apertures 23 are the flow rate and composition of the liquid-vapor mixture to be distributed. For example, if the liquid rate is such that it cannot be accomodated by one row of apertures 23, two or more such rows may be utilized. Although the apertures 23 may be at or near the level of the tray deck 22, the center lines of the apertures 23 preferably are in the range from about 1 inch to about 6 inches, more preferably from about 2 inches to about 5 inches, above the top of the tray deck 22 to provide a settling space for particulate matter, if any, which is present in the liquid-vapor mixture being distributed. In other words, the height H in FIG. 1 is preferably in the range from about 1 inch to about 6 inches, more preferably from about 2 inches to about 5 inches. In any event, it is preferred that each of the apertures 23 be at a substantially uniform distance H above the tray deck 22. When the apparatus is in use, it is preferable that the liquid level on the tray deck 22 be above the top of the apertures 23 by a distance L. The distance L is preferably at least about 3 times the diameter of the smallest aperture 23. The apertures 23 preferably have a diameter of at least about ½ inch and are preferably spaced around the circumference of chimney member 21 so that the center to center distance from aperture 23 to aperture 23 is equal to or more than about 2 aperture diameters.

Plate means 24 is disposed at a distance D above the top opening of chimney member 21 and is supported by support means 25. The distance D can vary over a wide range as desired depending on, for example, the flow rate and composition of the liquid-vapor mixture to be distributed. Typically, the distance D ranges from about 0.05 inch or less to about 1 foot or more. The cross-sectional area of plate means 24 is preferably at least as large, more preferably at least 2 times as large, as the cross-sectional area of the top opening of chimney members 21.

In operation the apparatus is placed above the bed of solid particles through which the liquid-vapor mixture is to be distributed. Typically, the tray deck 22 is placed from about 3 inches or less to about 3 feet or more above the bed of solid particles. The liquid of the liquid-vapor mixture to be distributed descends from above and is initially deflected by plate means 24 onto tray deck 22. Thus, the liquid is preferably substantially prevented from entering the top opening of chimney member 21 because of plate means 24. The vapor flows around plate means 24 and downwardly through the top opening in chimney member 21. The liquid builds to a level L above the tray deck 22 and eventually begins to flow through apertures 23. Thus, liquid-vapor distribution is achieved through the bed of solid particles below the tray deck 22.

An alternative embodiment of the apparatus is shown in FIGS. 2 and 3. The apparatus is shown in a portion of walled vessel 29. In this embodiment, a perforated tray 32 is supported in walled vessel 29 by tray supports 36 at a distance, for example, D as defined previously, above the top openings of the chimney members 31. Tray deck 33 is supported in walled vessel 29 by deck supports 37. Preferably, tray deck 33 is fitted into walled vessel 29 to provide a substantially liquid tight seal. Referring to FIGS. 2 and 3, the solid portions of perforated tray 32 restrict the generally downwardly flowing liquid-vapor mixture from entering directly into the top openings of chimney members 31. The perforated tray 32 has perforations 30 therein permitting the downflowing liquid-vapor mixture to flow therethrough. The perforations 30, preferably circular in shape, preferably comprise from about 10% to about 50% of the total cross-sectional area encompassed by the perforated tray 32. The chimney members 31 have at least one aperture 34 disposed at a height H above the tray deck 33. Of course, perforations 30 in perforated tray 32 are offset from chimney members 31 so that substantial amounts of liquid do not flow directly into the top opening of the chimney members 31. The chimney members 31 may be disposed at the center of triangles formed by adjacent perforations 30 in the perforated tray 32. However, any suitable arrangement can be provided as long as the perforations 30 in perforated tray 32 are disposed so as to substantially prevent liquid from entering directly into the top opening of chimney members 31.

The embodiment represented in FIGS. 2 and 3 is a preferred embodiment because of its improved structural durability. In addition, the installation of the perforated tray 32 is less difficult than the provision of plate means 24 supported by individual support means 25, as shown in FIG. 2. It is not necessary to substantially seal the perforated tray 32 along its circumference where it is attached, for example, to the interior wall of the vessel containing the bed of solid particles. This feature also simplifies installation and inspection procedures. However, the embodiment shown in FIG. 1 does provide better liquid-vapor distribution than prior art devices.

The distribution apparatus of the present invention may be fabricated from any suitable material of construction. The material of construction used is dependent upon the particular application involved. In many instances metals and metal alloys, such as iron, carbon steel, stainless steel and the like, may be used. Of course, the apparatus should be made of a material or combination of materials which is substantially unaffected by the fluid and the conditions, e.g., temperatures, pressures, and the like, at which the apparatus is normally to be operated. In addition, such material or materials should have no substantial detrimental effect on the fluid being processed or the process, e.g., hydrocarbon conversion process, in general.

Although the present invention is useful for fluid distribution through any bed of solid particles, it finds particular utility in distributing a liquid-vapor mixture through a bed of solid catalyst particles, such as those used in many hydrocarbon conversion processes.

The improved liquid-vapor distribution apparatus of the present invention can be employed in chemical reactors, e.g., walled vessels, which contain at least one bed of solid catalyst particles. Such reactors typically have cross-sectional areas, preferably circular, ranging from about 0.5 Ft.$^2$ or less to about 170 Ft.$^2$ or more, preferably from about 5 Ft.$^2$ to about 150 Ft.$^2$, and are from about 5 Ft. or less to about 125 Ft. or more, preferably from about 10 Ft. to about 70 Ft., in length. The solid catalyst particles used to form the bed or beds within such a reactor may have any suitable geometry, e.g., spheres, cylinders, pills, tablets, irregularly shaped particles, etc. Typically, such catalyst particles have a minimum dimension of at least about 0.01 in. and a maximum dimension up to about ½ in. or 1 in. or more.

The improved distribution apparatus of the present invention has particular utility when employed in reactor systems which carry out the catalytic chemical conversion of hydrocarbons such as that involved in petroleum refining and petrochemical processing and the like. Included among the conventional and well known hydrocarbon chemical reactions which may be promoted by such catalysts and in which the present apparatus and methods may be useful are oxidation, hydrosulfurization, hydrocracking, cracking, reforming, hydrogenation, polymerization, alkylation, isomerization, disproportionation and the like. Typical operating conditions and catalyst compositions employed in each of these catalytic reaction systems are well known to those skilled in the art and may be varied to meet the requirements of the individual hydrocarbon process. For this reason, an extensive list of reaction conditions and catalyst compositions is not included herein. However, to illustrate, typical examples of hydrocarbon hydrosulfurization catalysts comprise a support and any one or more of the transition metals, metal oxides, metal sulfides, or other metal salts which are known to catalyze hydrosulfurization. Hydrocarbon reforming catalysts typically comprise at least one platinum group metal on a support. Typical examples of hydrocracking catalysts include crystalline metallic aluminosilicate zeolites, having a platinum group metal, e.g., platinum or palladium, deposited thereon or composited therewith. Hydrogenation catalysts may comprise at least one Group VIII metal of the Periodic Table, such as nickel, cobalt, iron, the platinum group metals such as palladium, platinum, iridium, or ruthenium and mixtures thereof on a suitable support. Suitable carriers or supports for these catalysts may comprise materials such as silica, alumina, zirconia, titania, magnesia, boria, silica-alumina, silica-magnesia, acidic clays, halided alumina and the like. Mixtures of more than one of such materials may be used in these catalysts.

The distribution apparatus of the present invention is frequently employed to initially distribute liquid-vapor at the inlet of a reactor, as well as at other points further down the catalyst bed to insure good distribution throughout the bed of solid particles. These distribution means may also be used at points along the bed of solid particles when additional fluid, i.e., liquid, vapor or mixtures thereof, are introduced, for example, at quench zones where cold gas is injected to remove heat of reaction. Better liquid-vapor distribution is achieved with larger numbers of caps on the tray deck bearing the same, and the present invention is applicable to any number of caps distributed on such tray decks, and to any number of tray decks bearing these caps disposed along a bed of solid particles.

The following examples illustrate the improved liquid distribution achieved with the device of the present invention compared to the prior art device. The examples are meant to be illustrative only and the invention should not be limited thereby.

EXAMPLE 1

This example illustrates certain of the benefits of the present invention.

A distribution apparatus was made which included a tray deck and 6 hollow chimney members attached thereto. These chimney members extended 6.5 inches above the tray deck and were cylindrical with a top opening having an inner diameter of 2.75 inches. Plate means, supported by support means attached to the chimney members were positioned directly above each of the chimney members at a distance of 2 inches above the top opening of the chimney member. These plate means were circular in configuration and were 5 inches in diameter. Three 0.5 inch diameter circular apertures were disposed 120° apart around each chimney member. The distance between the tray deck and the center of the aperture was 3.75 inches.

In order to simulate an out-of-level condition of the tray deck, the level of one of the chimney members could be varied both above and below the nominal level of the other chimney members on the tray deck by a maximum of 0.5 inches. The ratio of liquid flow through this chimney member with the chimney member below the nominal level to the flow with the chimney member above the nominal level may be termed an index of level sensitivity and is a measure of the sensitivity of the distribution apparatus to the levelness of the tray deck. The higher the index of sensitivity, the more sensitive the apparatus is to being out of level.

A mixture of water, in the amount of 24 gallons per minute, and air, in the amount of 20 cubic feet per minute (at approximately 70° F. and 1 atmosphere pressure), was made to fall down toward this tray deck. The amount of water passing through each chimney member was determined. The level of the chimney member designated as chimney member 4 was varied as shown in the table below. The term "par" as used herein refers to the ratio of the amount of water flowing through an individual chimney member multiplied by the total number of caps to the total amount of water flowing downward toward the tray deck. For example, if the flow were equal among all 6 caps, the value of par would be 1.0 for each cap. The results of several tests are summarized below.

| Elevation of Chimney Member 4 Relative to Level of Other Chimney Members, Inches | Water Flow Through Individual Chimney Members, par Chimney Member | | | | | |
|---|---|---|---|---|---|---|
| | 1 | 2 | 3 | 4 | 5 | 6 |
| 0 | 1.00 | 0.99 | 0.97 | 0.97 | 1.03 | 1.03 |
| −0.5 | 0.98 | 1.03 | 1.00 | 1.03 | 0.98 | 0.99 |
| −0.25 | 1.02 | 1.03 | 0.99 | 0.98 | 0.99 | 0.99 |
| +0.25 | 1.00 | 1.11 | 1.00 | 0.89 | 1.01 | 0.99 |
| +0.5 | 0.98 | 1.04 | 1.01 | 0.90 | 1.06 | 1.00 |

Thus, chimney member 4 has the following indexes of level sensitivity:

| Elevation, Inches | Index of Level Sensitivity |
|---|---|
| −0.5/+0.5 | 1.14 |
| −0.25/+0.25 | 1.10 |

EXAMPLES 2 to 4

These examples illustrate certain of the improved results obtained from the present invention.

Example 1 was repeated three times except that the distribution apparatus was replaced by three tray decks having disposed thereon 6 caps such as shown in FIG. 4. The three sets of caps had the following dimensions (refer to FIG. 4).

| | Dimension, In. | | | |
|---|---|---|---|---|
| | A | B | C | E |
| Example 2 | 5 | 3 | 0.5 | 2 |
| Example 3 | 5 | 3 | 1.25 | 2 |
| Example 4 | 5 | 3 | 0.50 | 2 |

The caps used in Example 2 include 30 slots having a width dimension of 0.25 inch and a height dimension of 1.0 inch. The caps used in Example 3 include 30 slots having a width dimension of 0.25 inch and a height dimension of 0.25 inch. The caps used in Example 4 include 3 slots having a width dimension of 0.25 inch and a height dimension of 1.0 inch.

Results of these test were as follows:

| EXAMPLE 2 | | | | | | |
|---|---|---|---|---|---|---|
| Elevation of Cap 4 Relative to Level of Other Caps, Inches | Water Flow Through Individual Caps, par Cap | | | | | |
| | 1 | 2 | 3 | 4 | 5 | 6 |
| 0 | 1.07 | 1.03 | 1.01 | 0.92 | 0.98 | 0.99 |
| −0.5 | 0.50 | 0.43 | 0.38 | 3.76 | 0.49 | 0.45 |
| −0.25 | 0.81 | 0.74 | 0.70 | 2.33 | 0.70 | 0.71 |
| +0.25 | 1.11 | 1.04 | 1.17 | 0.92 | 0.89 | 0.86 |
| +0.5 | 1.16 | 1.14 | 1.3 | 0.41 | 1.04 | 0.95 |

| EXAMPLE 3 | | | | | | |
|---|---|---|---|---|---|---|
| Elevation of Cap 4 Relative to Level of Other Caps, Inches | Water Flow Through Individual Caps, par Cap | | | | | |
| | 1 | 2 | 3 | 4* | 5 | 6 |
| 0 | 1.15 | 1.04 | 0.83 | 0.94 | 0.89 | 1.13 |
| −0.5 | — | — | 0.56 | 3.19 | 0.56 | — |
| −0.25 | 0.89 | 0.85 | 0.80 | 1.70 | 0.90 | 0.87 |
| +0.25 | 1.00 | 0.96 | 1.06 | 1.42 | 0.80 | 0.77 |
| +0.5 | 1.08 | 1.06 | 1.17 | 0.87 | 0.95 | 0.87 |

*The behavior of this cap was erratic, and water flowed in surges down through it.

| EXAMPLE 4 | | | | | | |
|---|---|---|---|---|---|---|
| Elevation of Cap 4 Relative to Level of Other Caps, Inches | Water Flow Through Individual Caps, par Cap | | | | | |
| | 1 | 2 | 3 | 4 | 5 | 6 |
| 0 | 1.10 | 0.96 | 1.16 | 0.93 | 0.97 | 0.88 |
| −0.25 | 0.83 | 0.76 | 0.82 | 2.29 | 0.66 | 0.64 |
| +0.25 | 1.22 | 1.14 | 1.26 | 0.33 | 1.06 | 0.99 |
| +0.5 | 1.20 | 1.14 | 1.27 | 0.26 | 1.13 | 1.00 |
| −0.5 | 0.0 | 0.0 | 0.0 | 6.0 | 0.0 | 0.0 |

Thus, the various caps 4 and chimney member 4 have the following indexes of level sensitivity:

| | INDEX OF LEVEL SENSITIVITY | | | |
|---|---|---|---|---|
| Elevation, In., | Ex. 1 | Ex. 2 | Ex. 3 | Ex. 4 |
| −0.5/+0.5 | 1.14 | 9.17 | 3.67 | 6.94 |
| −0.25/+0.25 | 1.10 | 2.53 | 1.20 | 23.08 |

The liquid flow rates show that the apparatus of the present invention, illustrated in Example 1, is effective to distribute a liquid-vapor mixture. Based upon the indexes of level sensitivity, the distribution apparatus of the present invention is significantly less sensitive to the levelness of the tray deck than are prior art devices.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined a follows:

1. An apparatus for distributing a generally downwardly flowing liquid-vapor mixture through a bed of solid particles comprising:
   (a) a tray deck located above said bed of solid particles;
   (b) at least one hollow chimney member with a top opening in fluid communication with said bed of solid particles attached to said tray deck and extending upwardly from said tray deck, said chimney member having a plurality of apertures through said chimney member along the length of said chimney member not extending to the top opening and below the top opening of said chimney member to provide fluid communication between the space about said tray deck and the hollow space of said chimney member, the center lines of said apertures being located at a substantially uniform distance above said tray deck; and (c) plate means located at a distance D above the top opening of said chimney member whereby said mixture is restricted from flowing directly into the top opening of said chimney member.

2. The apparatus of claim 1 wherein (b) comprises a plurality of said hollow chimney members spaced across substantially the entire cross-section of said tray deck and said apertures through said chimney member along the length of said chimney member below said top opening are located so that when said apparatus is in use, said liquid level on said tray deck is above the top of said apertures.

3. The apparatus of claim 1 wherein said plate means has a cross-sectional area of at least as large as the cross-sectional area of said top opening of said chimney member and wherein said liquid level on said tray deck is above the top of said aperture by a distance L wherein said distance L is at least about three times the diameter of said aperture.

4. The apparatus of claim 3 wherein said top opening is from about 1 inch to about 24 inches above said tray deck and is from about 3 square inches to about 100 square inches in area, said apertures are from about 0.05 square inches to about 3.0 square inches in area, the center lines of the apertures is in the range from about near the level of said tray deck to about 6 inches above said tray deck and said plate means is in the range from about 0.05 inch to about 1 foot above said top opening.

5. The apparatus of claim 3 wherein said hollow chimney members are cylindrical in shape, said apertures are circular in shape and the cross-sections of said top opening and said plate means are circular in shape.

6. The apparatus of claim 1 wherein said plate means comprises a perforated member the solid portion of which is situated so as to restrict said mixture from flowing directly into the top openings of said chimney members.

7. The apparatus of claim 6 wherein said perforations of said perforated member comprise from about 10% to about 50% of the total cross-sectional area encompassed by said perforated members.

8. The apparatus of claim 7 wherein said top opening is from about 1 inch to about 24 inches above said tray deck and is from about 3 square inches to about 100 square inches in area, said apertures are from about 0.05 square inches to about 3.0 square inches in area, the center lines of the apertures and in the range from about near the level of said tray deck to about 6 inches above said tray deck and said perforated member is in the range from about 0.05 inch to about 1 foot above said top openings.

9. The apparatus of claim 8 wherein said hollow chimney members are cylindrical in shape, said apertures are circular in shape and the cross-sections of said top opening and said perforations are circular in shape.

10. A process for distributing a generally downwardly flowing liquid-vapor mixture through a bed of solid particles which comprises: causing said liquid-vapor mixture to flow toward a tray deck located above said bed of solid particles whereby at least a portion of said vapor enters top openings of a plurality of hollow chimney members attached to said tray deck and extending upwardly from said tray deck, spaced across substantially the entire cross-section of said tray deck, and in fluid communication with said bed of solid particles, and a major portion of said liquid enters the hollow spaces of said chimney members through a plurality of apertures along the length of said chimney members below said top openings of said chimney members, the center lines of said apertures being located at a substantially uniform distance above said tray deck, by building to a level above the level of apertures of said chimney members, said liquid-vapor mixture being restricted from flowing directly into said top openings of said chimney members by a plate means located above said top openings of said chimney members, at least a portion of said vapor entering said top openings from about 1 inch to about 24 inches above said tray deck through an area of from about 3 square inches to about 100 square inches, and at least a portion of said liquid entering said apertures which are from about 0.05 square inches to about 3.0 square inches in area and said liquid attaining a level above the top of said apertures by at least about three times the diameter of the smallest aperture.

* * * * *